(12) United States Patent
Weingarten

(10) Patent No.: US 11,281,241 B2
(45) Date of Patent: *Mar. 22, 2022

(54) PRESSURE REDUCING AND RELIEF VALVE

(71) Applicant: BERMAD CS LTD., Kibbutz Evron (IL)

(72) Inventor: Zvi Weingarten, Kibbutz Evron (IL)

(73) Assignee: BERMAD CS LTD., Kibbutz Evron (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/323,121

(22) Filed: May 18, 2021

(65) Prior Publication Data

US 2021/0365055 A1 Nov. 25, 2021

Related U.S. Application Data

(63) Continuation of application No. 16/882,588, filed on May 25, 2020, now Pat. No. 11,126,209.

(51) Int. Cl.
*G05D 16/10* (2006.01)
*F16K 1/12* (2006.01)

(52) U.S. Cl.
CPC ............ *G05D 16/107* (2019.01); *F16K 1/126* (2013.01); *G05D 16/103* (2013.01)

(58) Field of Classification Search
CPC .. G05D 16/101; G05D 16/103; G05D 16/106; G05D 16/107; F16K 1/126; F16K 17/0473; Y10T 137/2574; Y10T 137/2605; Y10T 137/2612; Y10T 137/2615; Y10T 137/265; Y10T 137/2655; Y10T 137/2663; Y10T 137/2668

See application file for complete search history.

(56) References Cited

U.S. PATENT DOCUMENTS

| | | | | | |
|---|---|---|---|---|---|
| 662,385 | A | ‡ | 11/1900 | Arnott | F21L 23/00 431/103 |
| 1,524,400 | A | * | 1/1925 | Larner | F16K 1/126 137/222 |
| 2,663,121 | A | ‡ | 12/1953 | Ramsey | G05D 16/0663 137/116.3 |

(Continued)

FOREIGN PATENT DOCUMENTS

JP H0215315 A ‡ 1/1990

*Primary Examiner* — Michael R Reid
(74) *Attorney, Agent, or Firm* — Mark M. Friedman

(57) ABSTRACT

A pressure regulating and pressure relief valve, has a valve body defining an inlet port, outlet port, valve seat and pressure relief opening. A pressure regulating plug is displaced during a first portion of a motion from an open position, which provides a continuous flow path from the inlet port to the outlet port, to a closed position in which the plug is closed against the valve seat to obstruct the continuous flow path. A spring biases the plug to the open position. An actuation surface is exposed to a pressure at the outlet port that displaces the plug against the spring bias toward the closed position. Further displacement of the plug beyond the closed position during a second portion of the motion that is beyond a range of the first portion of the motion, opens a relief flow path from the outlet port through the pressure release opening.

26 Claims, 11 Drawing Sheets

(56) References Cited

U.S. PATENT DOCUMENTS

| | | | | |
|---|---|---|---|---|
| 2,720,887 | A | ‡ | 10/1955 | Safford ................ F16K 17/168 137/116.5 |
| 2,854,990 | A | * | 10/1958 | Granberg ............. G05D 7/0106 137/220 |
| 4,862,914 | A | ‡ | 9/1989 | Weingarten ............ B01D 29/66 137/544 |
| 11,126,209 | B1 | * | 9/2021 | Weingarten .......... G05D 16/107 |

\* cited by examiner
‡ imported from a related application

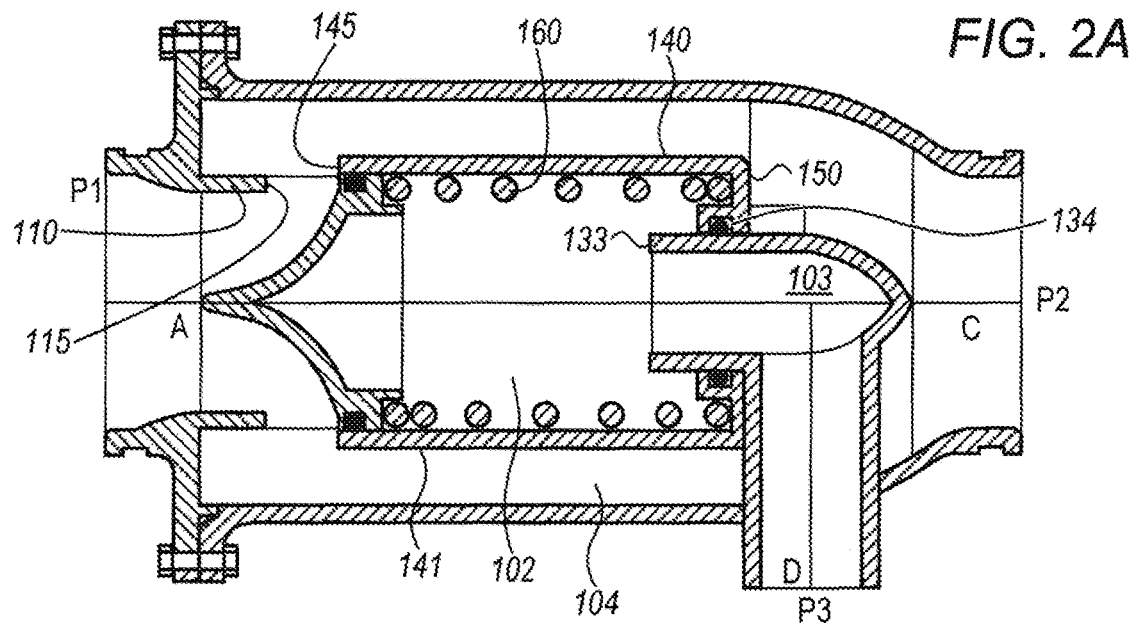
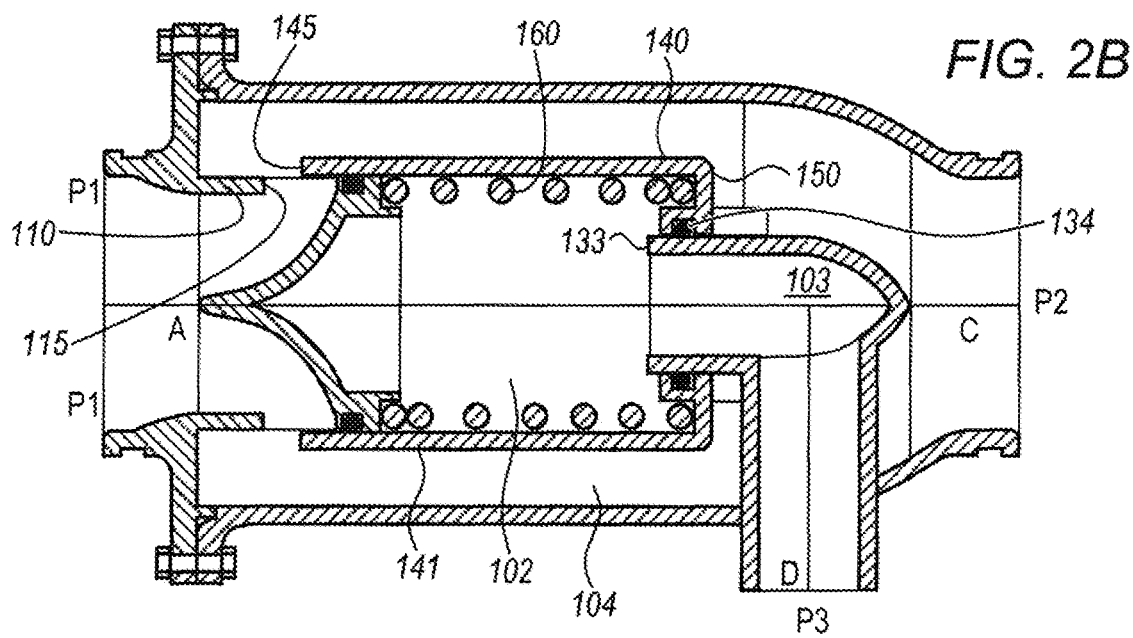

PRESSURE REDUCING AND RELIEF VALVE

FIELD AND BACKGROUND OF THE INVENTION

The invention relates to a pressure reducing valve and, in particular, it concerns a pressure reducing valve with an integrated pressure release function.

Irrigation Low Pressure Systems (LPS) tubes are delicate and subject to rupture on overpressure and pressure surges. To protect them from damage, such systems are typically provided with pressure reducing valves (PRV) which throttle a variable inlet pressure to produce a relatively constant outlet pressure at a desired value.

SUMMARY OF THE EMBODIMENTS

One aspect is a pressure regulating and pressure releasing valve, comprising (a) a valve body defining an inlet port, an outlet port, a valve seat and a pressure release opening; (b) a pressure regulating plug configured to be displaced during a first portion of a motion from an open position, which provides a continuous flow path from the inlet port to the outlet port, to a closed position in which the plug is closed against the valve seat to obstruct the continuous flow path; (c) a spring configured to bias the plug from the closed position to the open position, the plug having an actuation surface exposed to a pressure at the outlet port such that the pressure at the outlet port displaces the plug against the bias of the spring toward the closed position, wherein further displacement of the plug beyond the closed position during a second portion of the motion that is beyond a range of the first portion of the motion, opens a relief flow path from the outlet port through the pressure release opening to an area external to the valve body.

In some embodiments, the valve body has a central part and a peripheral part and wherein the valve seat and the plug are structured such that the continuous flow path travels through the peripheral part and at least a portion of the relief flow path travels through the central part. In some embodiments, an outer wall of the plug is radially outward from the valve seat relative to a longitudinal axis running through a central part of the valve body from the inlet port to the outlet port. In some embodiments, the pressure regulating and pressure releasing valve further comprises a central relief conduit situated such that the relief flow path passes between a rear wall of the plug and the central relief conduit. In some embodiments, the relief flow path runs through an opening in a side wall of the plug.

In some embodiments, the valve body has a central part and a peripheral part and wherein the valve seat and the plug are structured such that the fluid flow path travels through the central part and the relief flow path is in the peripheral part of the valve body. In some embodiments, an outer wall of the plug is radially inward from an inner wall of the valve seat relative to a longitudinal axis running through the central part of the valve body from the inlet port to the outlet port.

In some embodiments, the central part of the valve body is inside the plug.

In some embodiments, the peripheral part of the valve body is radially outward from the plug relative to a longitudinal axis running through a central part of the valve body from the inlet port to the outlet port.

In some embodiments, a forward and inward edge of a sleeve of the plug is situated relative to the valve seat such that the continuous flow fluid does not affect displacement of the plug.

In some embodiments, the continuous flow path is provided from the inlet port passing between the valve seat and the plug and continuing to the outlet port.

In some embodiments, the actuation surface comprises a flange at a rear of the plug.

In some embodiments, the plug is displaced linearly relative to the valve seat during the motion.

In some embodiments, the spring and plug are configured such that when pressure at the outlet port drops below a set point, the plug is opened by the spring and the continuous flow path is restored so as to recover pressure at the outlet port.

In some embodiments, the valve body has a central part and a peripheral part and the valve seat and the plug are structured such that one of the following is true: (i) the fluid flow path travels through the peripheral part and at least a portion of the relief flow path travels through the central part, (ii) the fluid flow path travels through the central part and the relief flow path is in the peripheral part of the valve body.

In some embodiments, a sleeve of the plug is long enough that the further displacement of the plug beyond the closed position during the second portion of the motion begins to open the relief flow path only after the closed position in which the plug is closed against the valve seat, wherein a length of the sleeve of the plug beyond a threshold length of the sleeve corresponds to a range of positions in which the plug has closed against the valve seat without the relief flow path having opened.

In some embodiments, the further displacement of the plug beyond the closed position during the second portion of the motion begins to open the relief flow path just when the plug is closed against the valve seat.

Another aspect is a pressure regulating and pressure relief valve, comprising (a) a valve body defining an inlet port, an outlet port, a valve seat and a pressure relief opening; (b) a pressure regulating plug configured to be displaced during a first portion of a motion from an open position, which provides a continuous flow path from the inlet port to the outlet port, to a closed position in which the plug is closed against the valve seat to obstruct the continuous flow path; (c) a spring configured to bias the plug from the closed position to the open position, the plug having an actuation surface exposed to a pressure at the outlet port such that the pressure at the outlet port displaces the plug against the bias of the spring toward the closed position, wherein further displacement of the plug beyond the closed position during a second portion of the motion that is beyond a range of the first portion of the motion, opens a relief flow path from the outlet port through the pressure release opening to an area external to the valve body, wherein the valve body has a central part and a peripheral part and wherein the valve seat and the plug are structured such that the continuous flow path travels through the peripheral part and at least a portion of the relief flow path travels through the central part, wherein a forward and inward edge of the plug is situated relative to the valve seat such that the continuous flow fluid does not affect displacement of the plug.

A still other aspect is a pressure regulating and pressure releasing valve, comprising (a) a valve body defining an inlet port, an outlet port, a valve seat and a pressure release opening; (b) a pressure regulating plug configured to be displaced during a first portion of a motion from an open position, which provides a continuous flow path from the inlet port to the outlet port, to a closed position in which the plug is closed against the valve seat to obstruct the continuous flow path; (c) a spring configured to bias the plug from the closed position to the open position, the plug having an actuation surface exposed to a pressure at the outlet port such that the pressure at the outlet port displaces the plug against the bias of the spring toward the closed position, wherein further displacement of the plug during a second portion of the motion opens a relief flow path from the outlet port through the pressure release opening to an area external to the valve body and wherein a sleeve of the plug is short enough that the further displacement opens the relief flow path prior to the closing of the plug against the valve seat such that the first portion and the second portion of the motion overlap, wherein a diminution of the length of the sleeve less than the threshold length corresponds to a range of positions in which the relief flow path opens without the plug having closed against the valve seat.

These and other features, aspects and advantages of the invention will become better understood with reference to the following drawings, descriptions and claims.

BRIEF DESCRIPTION OF THE DRAWINGS

Various embodiments are herein described, by way of example only, with reference to the accompanying drawings, wherein:

FIG. 2A is a sectional view of a valve that has a fluid flow path running through the peripheral part of the valve body in an open position and the relief port in closed position, in accordance with an embodiment of the invention;

FIG. 2B is a sectional view of a valve that has a fluid flow path running through the peripheral part of the valve body with the plug partially displaced and the relief port in closed position, in accordance with an embodiment of the invention;

DETAILED DESCRIPTION OF THE EMBODIMENTS

Figure 1A:
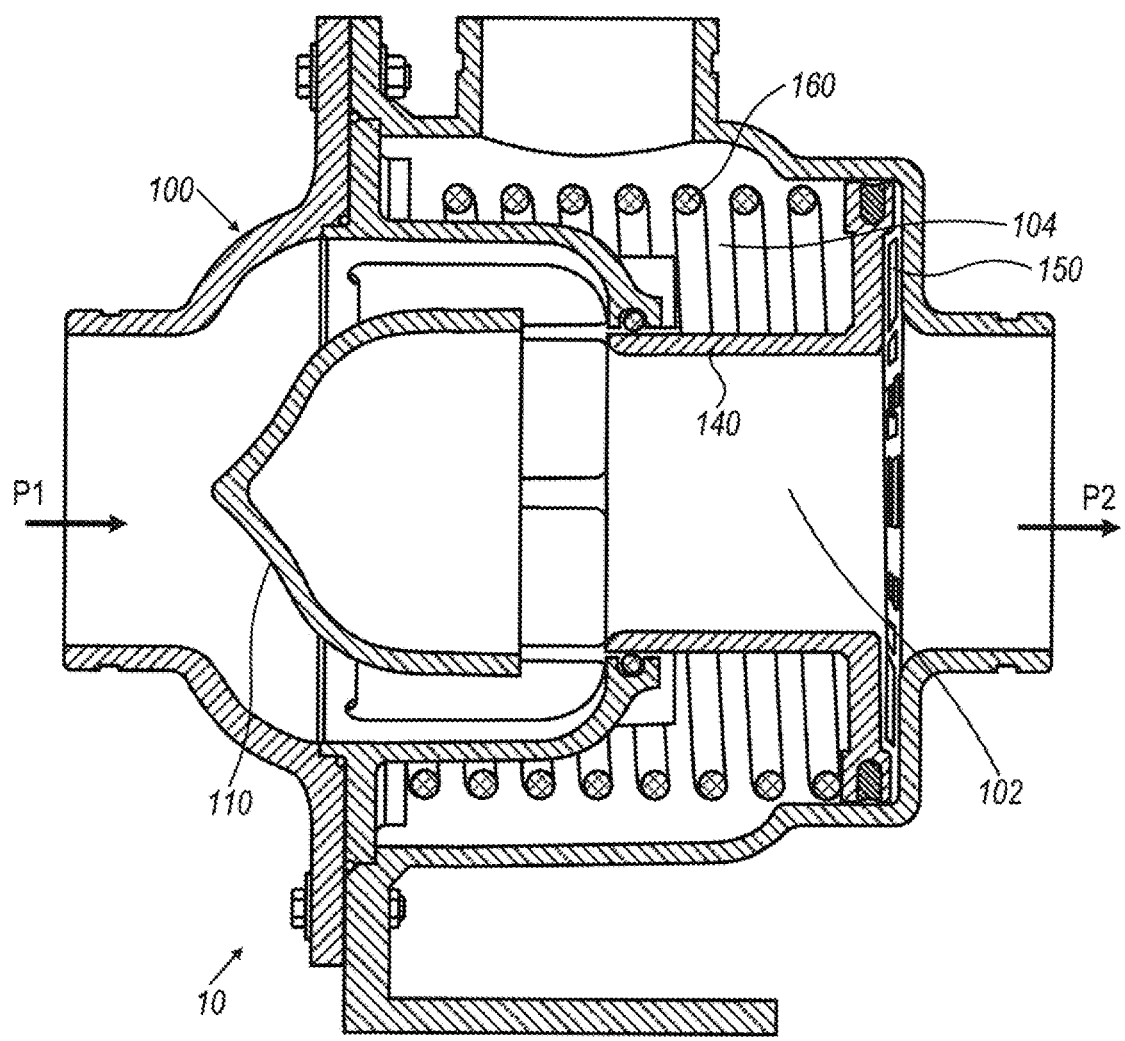
FIG. 1A is a sectional view of a valve that has a fluid flow path running through the central part of the valve body in an open position while the relief port is closed, in accordance with an embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

As an additional precaution, low pressure irrigation systems may be provided with a pressure relief valve which opens in the case of excess pressure in the line to vent the excess pressure to the atmosphere. Instead of the pressure relief valve being an additional system component which would add cost and involve additional installation and maintenance overheads to the system, in certain embodiments a single valve functions as a pressure regulation valve and a pressure relief valve, in one valve body.

Additionally, instead of starting to operate the pressure relief function only when the pressure peaks above a preset level, and suffering from a relatively slow response time, the valve, in certain embodiments, prevents a pressure surge and buildup prior to development of the pressure surge and buildup on the downstream system. The valve ties the relief opening move to the pressure reducing move, anticipating and eliminating the potential downstream pressure rise. The relief port is configured to open on the same pressure regulation/reduction move. In contrast, existing pressure reduction valves react to remedy the downstream pressure only after the valve senses the pressure rise over the set points.

The principles and operation of a Pressure Reducing and Relief Valve according to the invention may be better understood with reference to the drawings and the accompanying description.

As shown in FIG. 1A through FIG. 3E, a pressure reducing and pressure releasing valve 10 comprises a valve body 100 defining an inlet port A and an outlet port C, a valve seat 110 and a pressure release opening D also called the pressure relief port D.

Valve 10 also comprises a pressure regulating plug 140 configured to be displaced during a first portion of a motion from an open position, which provides a continuous flow path from the inlet port A to the outlet port C (by for example passing between the valve seat 110 and plug 140), to a closed position in which the plug 140 is closed against the valve seat 110 to obstruct the continuous flow path. During the first portion of the motion the closed position is reached when plug 140 is displaced enough to contact valve seat 110, thereby cutting off the continuous flow path (of fluid such as water). The displacement of plug 140 may be linear relative to valve seat 110 during the first part (and second part) of the motion.

Valve 10 further comprises a spring 160 configured to bias the plug 140 from the closed position to the open position. Plug 140 typically has an actuation surface 150 exposed to a pressure at the outlet port C such that the pressure at the outlet port C displaces the plug 140 against the bias of the spring 160 toward the closed position. Actuation surface 150 may be a flange at a rear of plug 140.

Figure 1B:
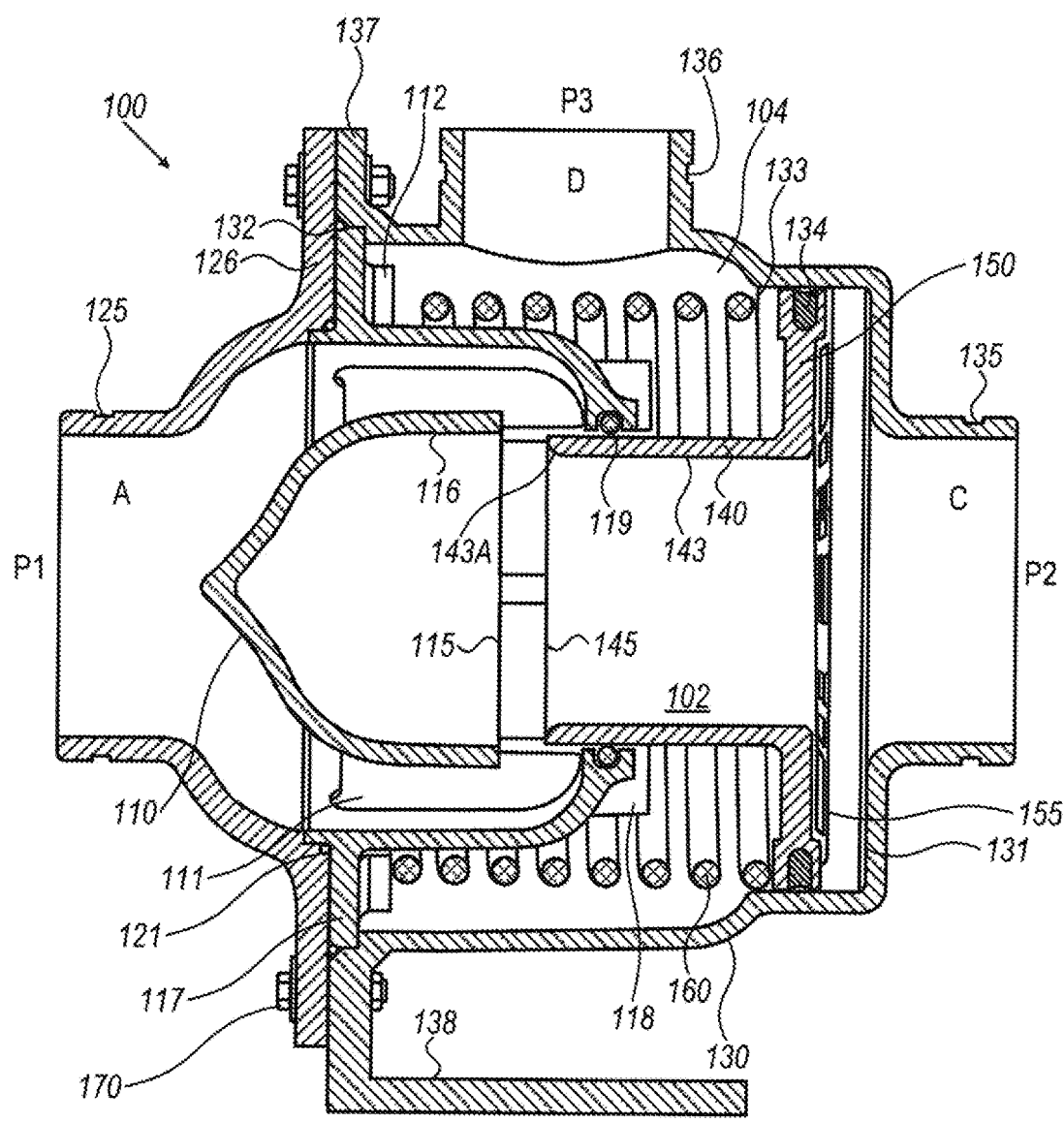
FIG. 1B is a sectional view of the valve of FIG. 1A valve that has a fluid flow path running through the central part of the valve body with the plug partially displaced and the relief port remains closed, in accordance with an embodiment of the invention.
Figure 1C:
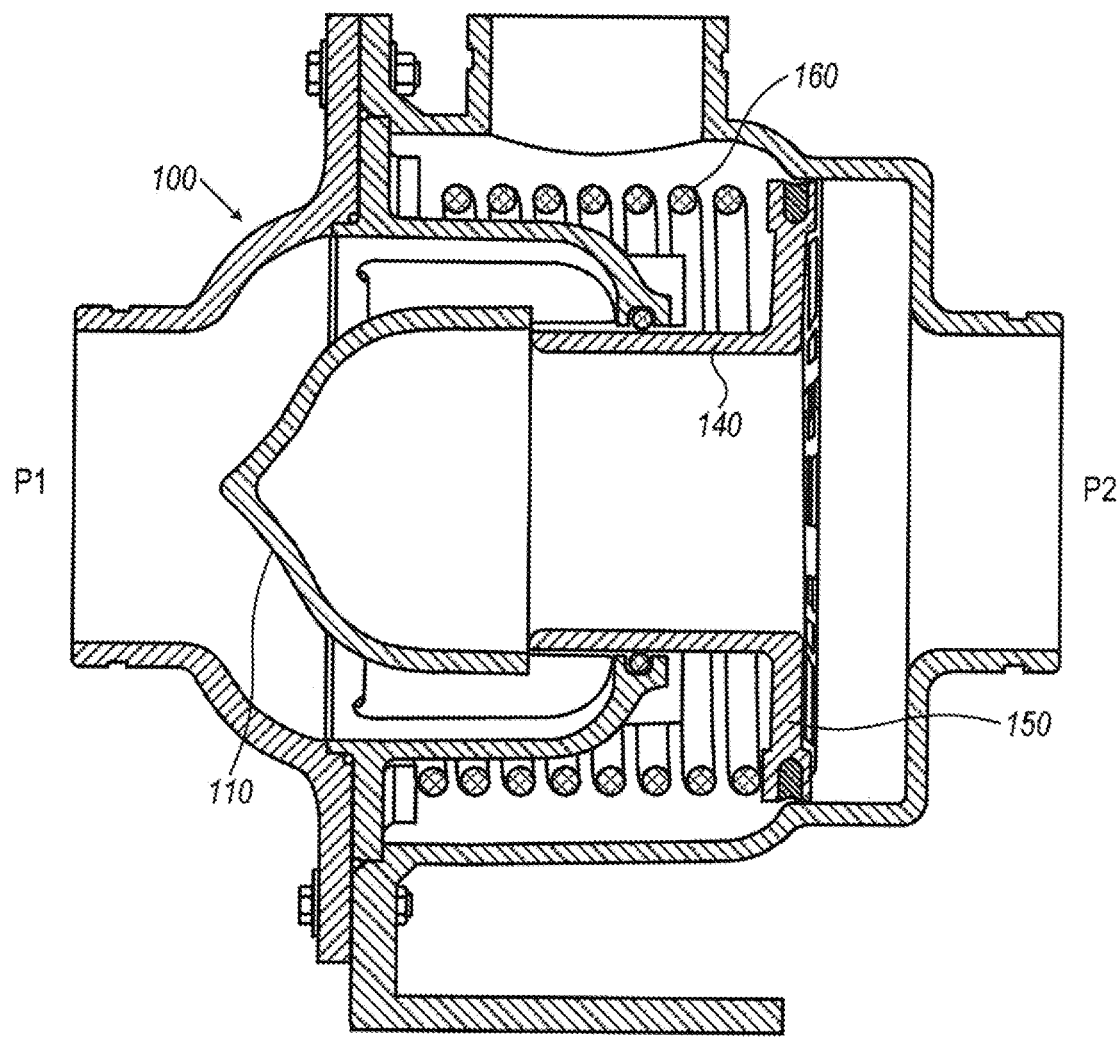
FIG. 1C is a sectional view of a valve that has a fluid flow path running through the central part of the valve body in a closed position and the relief port still remains closed, in accordance with an embodiment of the invention.

As seen for example in FIG. 1B, valve seat 110 has a cylindrical portion and sleeve 143 of plug 140 also has a cylindrical portion. The cylindrical portion of plug 140 moves telescopically in overlap with the cylindrical portion of valve seat 110 during a second portion of the motion.

Figure 1D:
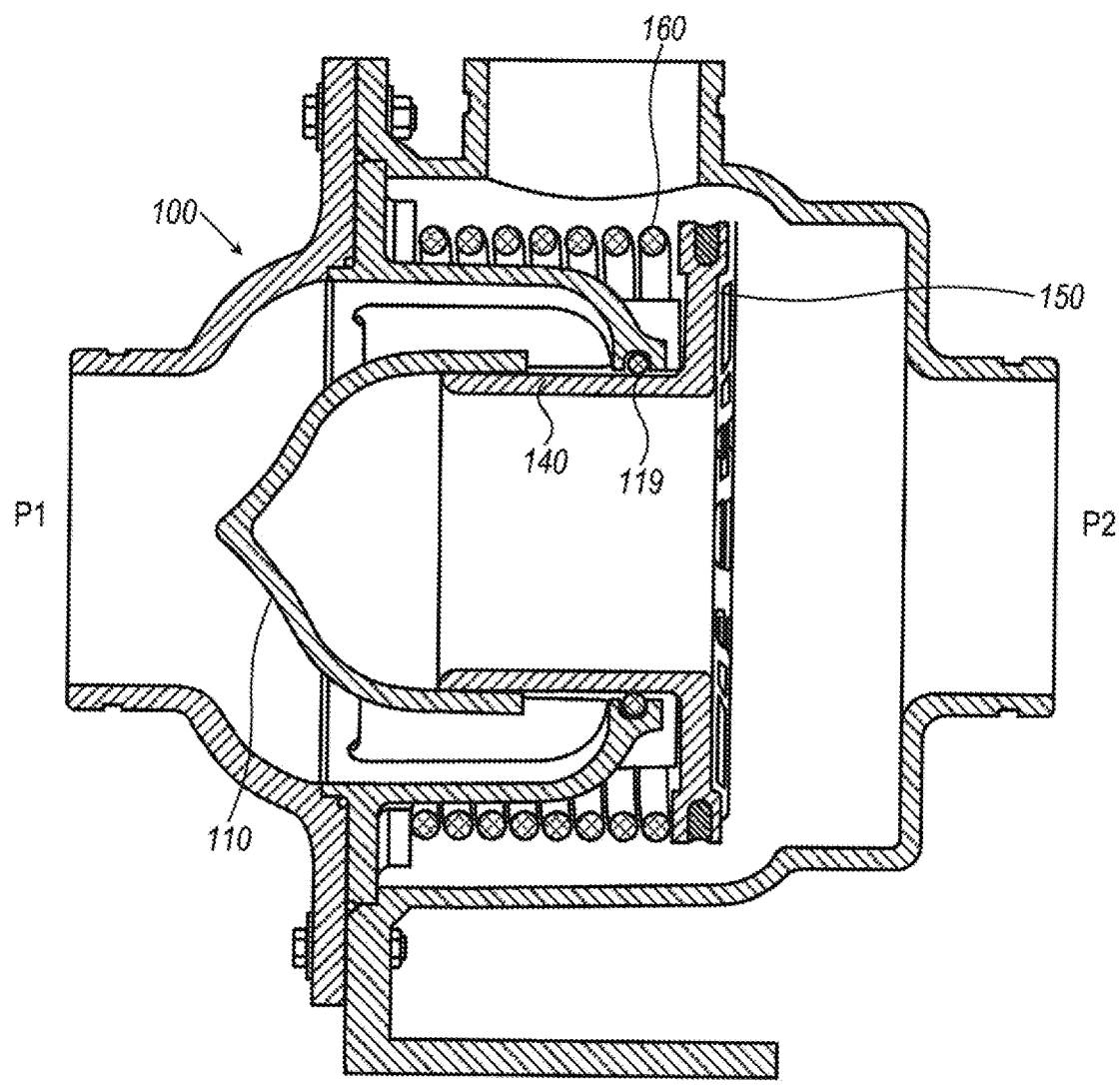
FIG. 1D is a sectional view of the valve of a valve that has a fluid flow path running through the central part of the valve body with the plug fully displaced beyond the closed position and the relief port is fully open, in accordance with an embodiment of the invention.

As shown in FIG. 1D (and FIG. 2D and FIG. 3D), further displacement of plug 140 beyond the closed position during a second portion of the motion that is beyond a range of the first portion of the motion, opens a relief flow path from the outlet port C through the pressure release opening D to an area external to the valve body 100.

FIG. 1A through FIG. 1D depicts one particular configuration of valve body 100. In this configuration, valve body 100 has a central part 102 and a peripheral part 104. Valve seat 110 and plug 140 are structured such that the fluid flow path travels through the central part 102 of valve body 100 and the relief flow path is in the peripheral part 104 of the valve body 100. An outer wall of plug 140 may be radially inward from an inner wall (throat) of the valve seat 110 (relative to a longitudinal axis running through the central part of the valve body from the inlet port to the outlet port).

FIG. 2A through FIG. 2D depicts another configuration of valve body 100 in which the valve seat 110 and the plug 140 are structured such that the continuous flow path (of fluid such as water) travels through the peripheral part 104 and at least a portion of the relief flow path travels through the central part 102. An outer wall 141, for example an outer side wall 141, of plug 140 may be radially outward from valve seat 110. Valve body 100 further comprises a central relief conduit 103 situated such that the relief flow path passes between a rear wall of the plug and the central relief conduit 103.

Figure 2C:
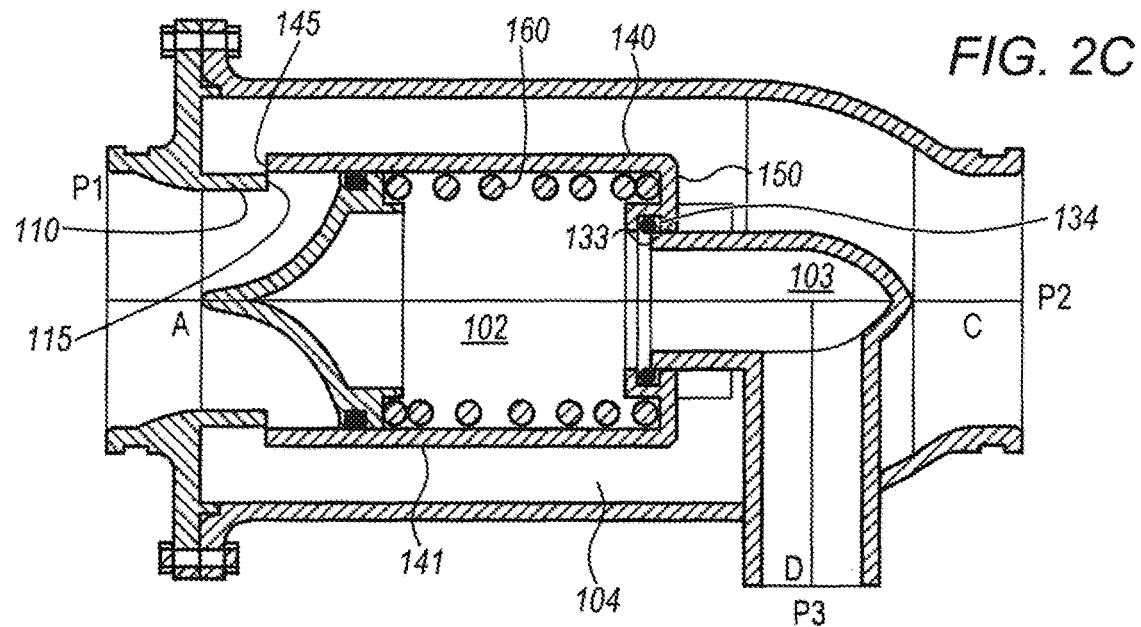
FIG. 2C is a sectional view of a valve that has a fluid flow path running through the peripheral part of the valve body in a closed position and the relief port in closed position, in accordance with an embodiment of the invention.
Figure 2D:
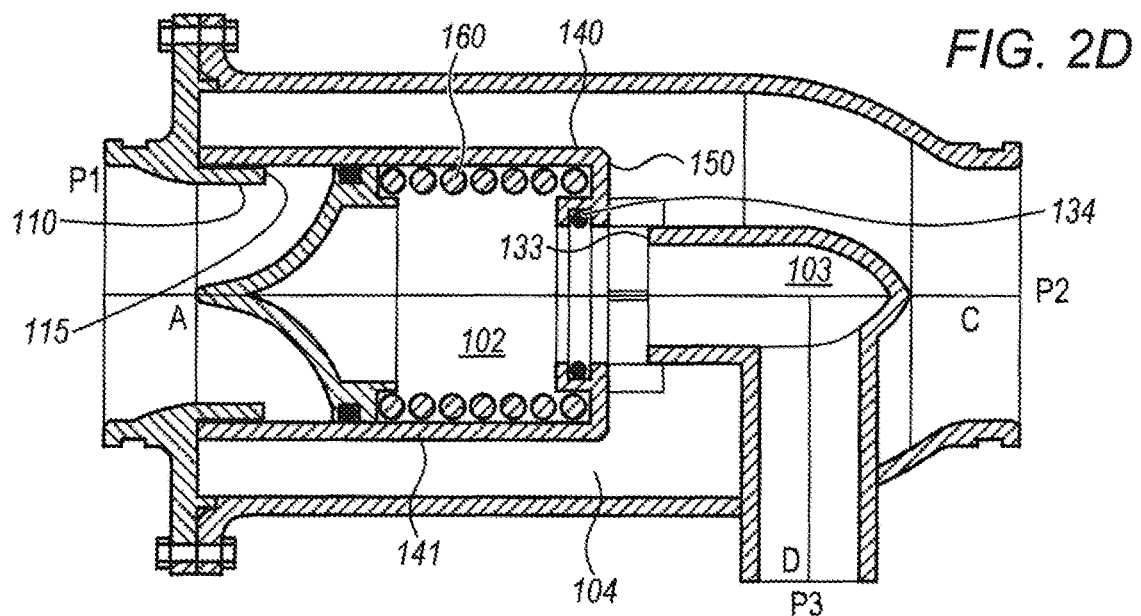
FIG. 2D is a sectional view of a valve that has a fluid flow path running through the peripheral part of the valve body with the plug fully displaced beyond the closed position and the relief port in fully open position, in accordance with an embodiment of the invention.
Figure 3A:
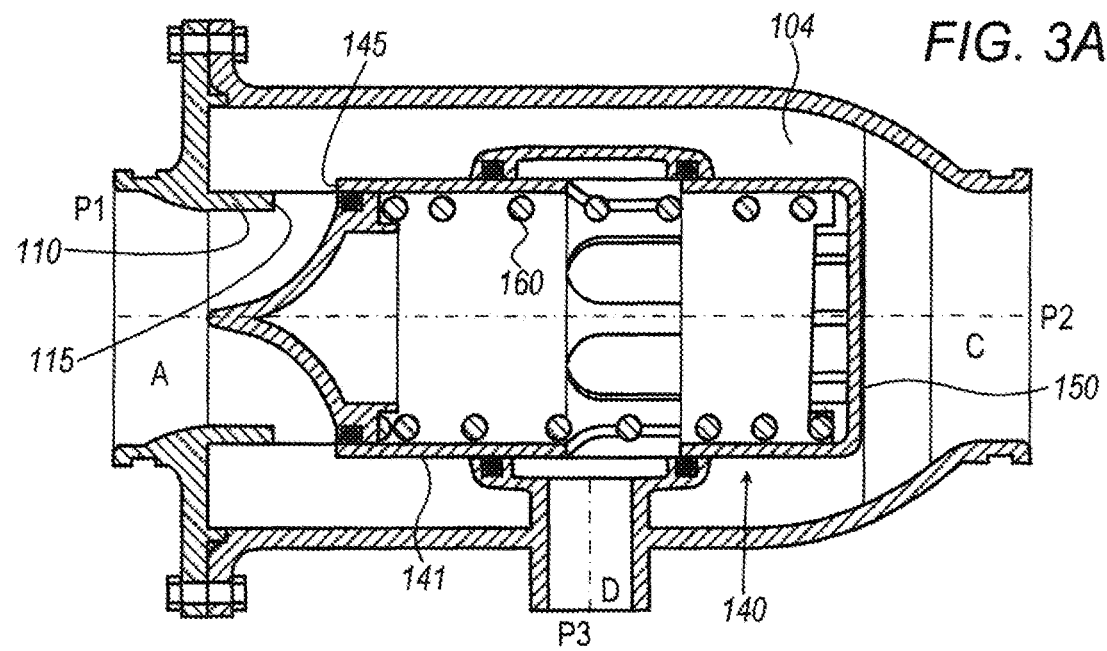
FIG. 3A is a sectional view of a valve that has a fluid flow path running through the peripheral part of the valve body in an open position and the relief port in closed position, in accordance with an embodiment of the invention.
Figure 3B:
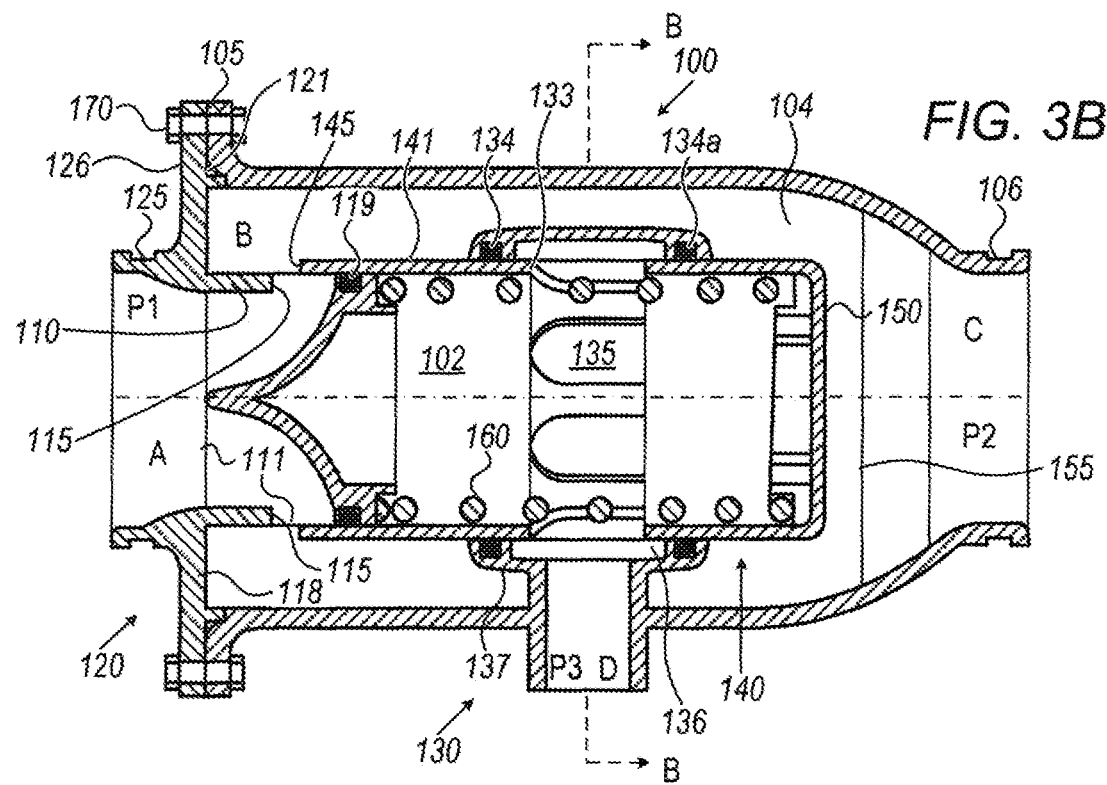
FIG. 3B is a sectional view of a valve that has a fluid flow path running through the peripheral part of the valve body with the plug partially displaced and the relief port in closed position, in accordance with an embodiment of the invention.
Figure 3C:
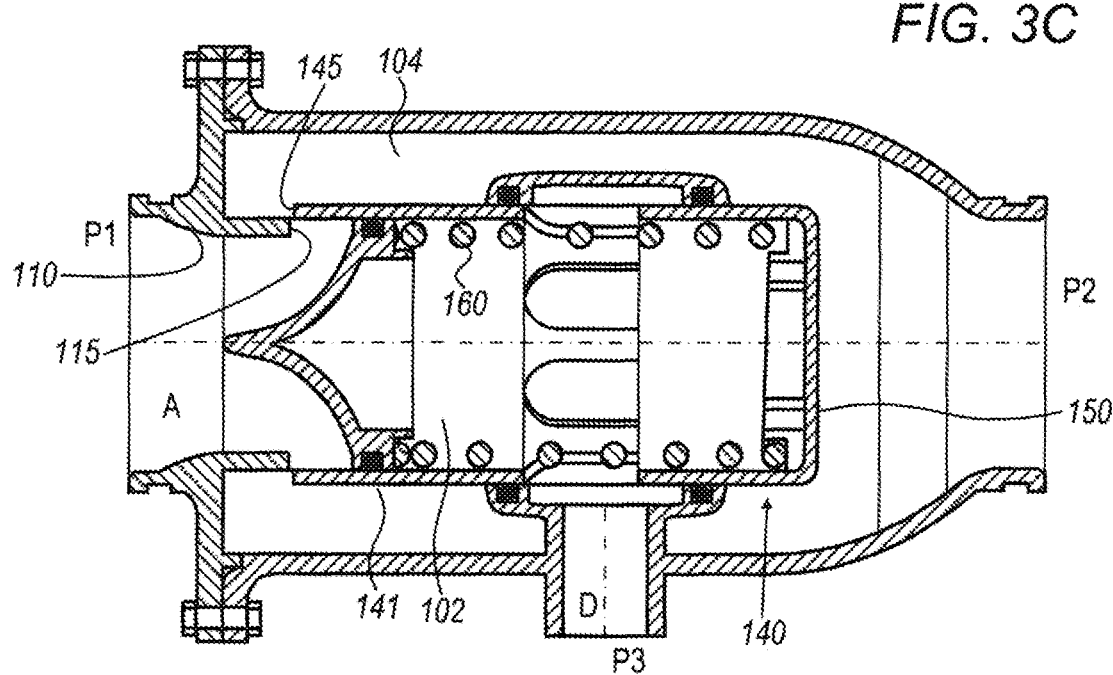
FIG. 3C is a sectional view of a valve that has a fluid flow path running through the peripheral part of the valve body in a closed position and the relief port in closed position, in accordance with an embodiment of the invention.
Figure 3D:
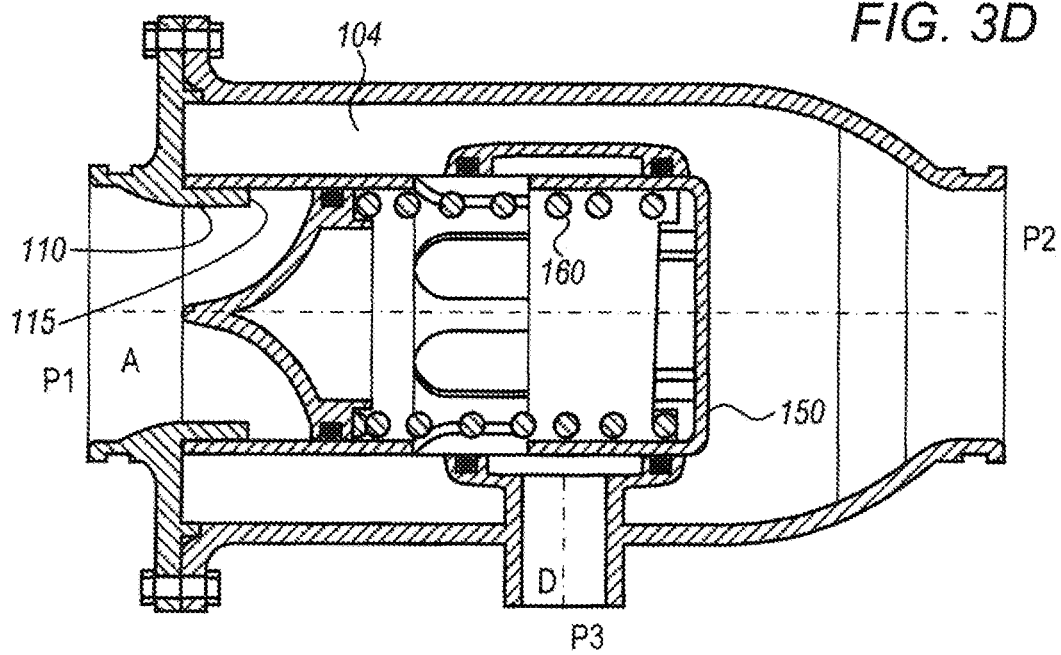
FIG. 3D is a sectional view of a valve that has a fluid flow path running through the peripheral part of the valve body with the plug fully displaced beyond the closed position and the relief port in fully open position, in accordance with an embodiment of the invention.
Figure 3E:
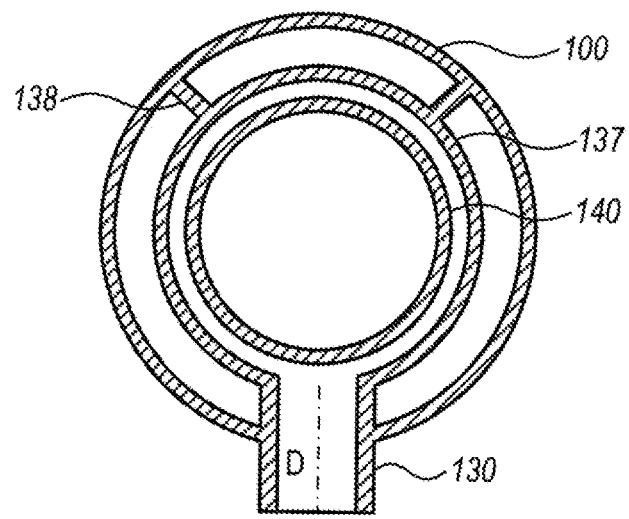
FIG. 3E is a sectional view taken along line B-B of FIG. 3B, in accordance with an embodiment of the invention.

FIG. 3A through FIG. 3E depicts another configuration of valve body 100 in which the valve seat 110 and the plug 140 are structured such that the continuous flow path travels through the peripheral part 104 and at least a portion of the relief flow path travels through the central part 102 (as in FIGS. 2A-2D). An outer wall of the plug 14 may be radially outward from the valve seat 110. In this version shown in FIGS. 3A-3E, however, the relief flow path runs through an opening in a side wall 141 of plug 140 rather than alongside the rear wall 150 of plug 140. In one implementation, the relief flow path travels through relief windows 135 in the central part 102 of valve body 100 to reach the relief port D at which pressure is P3 (atmospheric pressure) (FIG. 3B).

In general, valve body 100 has a central part 102 and a peripheral part 104 and the valve seat 110 and plug 140 are structured such that one of the following is true: (i) the fluid flow path travels through the peripheral part 104 of valve body 100 and at least a portion of the relief flow path travels through central part 102 of valve body 100 or (ii) the fluid flow path travels through central part 102 of valve body 100 and the relief flow path is in the peripheral part 104 of valve body 100.

In accordance with certain embodiments, for example those shown in FIGS. 1-3E, FIGS. 2A-2D and FIGS. 3A-3E, displacement of plug 140 is not affected by the pressure at the inlet port A. This may be accomplished by configuring the placement of the edge 143A of the sleeve 143 of plug 140 (i.e. the most forward and inward edge of plug 140 or of sleeve 143) relative to throat 116 of valve seat 110 as shown in FIG. 1B (which removes the effect of pressure from inlet port A against plug 140) or as shown in FIG. 2B or as shown in FIG. 3B. The forward edge of sleeve 143 is situated relative to valve seat 110 such that the continuous flow fluid (from inlet port A) does not affect displacement of the plug 140 (or does affect it significantly).

Operation of the Valve Shown in FIG. 1A through FIG. 1D

Plug 140 may have a flange 150 at the rear of plug 140 that functions as an actuation surface 150. This actuation surface/flange 150 also functions as the Relief closure. Plug 140 and piston 150 move past the closed position into the throat 116 and open the relief port D as the seal 134 move away from the seat line 133.

Plug 140 is not affected by the upstream pressure P1 and is driven by the piston 150 pushed by the downstream pressure P2 and plug 140 stays in equilibrium with the preset spring 160 force.

The plug 140 closing position starts at the point at which the edge 143A of plug 140 engages the seat lip 115.

The opening of the relief port D starts as the piston seal 134 move away from the relief seat line 133.

To avoid plug 140 getting stuck when it meets valve seat 110, the fit between them cannot be too tight. One option is leaving a minimal clearance. A further option is to have, besides plug seal 119, an additional seal (not shown) similar to the O-ring plug seal 119. This additional seal may be situated between plug 140 and throat 116 of valve seat 110 in order to seal the space between plug 140 and throat 116 of valve seat 110. This is relevant beginning in the closed position of FIG. 1C and continuing after plug 140 is displaced further as shown in FIG. 1D. Such an additional seal would be as an alternative to relying on leaving the minimal clearance between plug 140 and throat 116 to minimize leakage of fluid. Use of the additional seal would be a design consideration that depends on whether one considers the minimal leakage (resulting from leaving the minimal clearance without the additional seal) to be acceptable.

As the downstream pressure P2 rises, piston's 150 force prevails over the force of the spring 160 and plug 140 moves to close, thereby reducing the downstream pressure P2.

If the downstream pressure P2 drops beyond the set point, the spring 160 prevails and the valve plug 140 opens thereby recovering the downstream pressure P2. Spring 160 and plug 140 are configured such that when pressure at the outlet port C drops below a set point, plug 140 is opened by spring 160 and the continuous flow path is restored so as to recover pressure P2 at the outlet port C.

The following parts of valve body 100 are labeled in FIGS. 1A-1D:

A Inlet port
B Throttled downstream pressure zone
C Outlet port
D Relief port
P1 Upstream pressure
P2 Downstream pressure P3 Relief pressure (Atmosphere)
100 Pressure Reducing—Relief Valve Body
110 Seat segment
111 Rib
112 Rib
115 Seat lip
116 Seat throat
117 Seat segment flange
118 Stop rib
119 Plug seal
120 Inlet body segment
121 Seal
125 Inlet connection grooved
126 Inlet segment flange
130 Outlet body segment
131 Outlet back wall
132 Seal
133 Relief seat
134 Relief seal
135 Outlet connection grooved
136 Relief connection grooved
137 Outlet segment flange
138 Outlet segment leg
140 Throttling plug
150 Piston
155 Stop rib
160 Spring
170 Bolt—Washer-Nut Operation of the Valve Shown in FIGS. 2A-2D Plug 140 may have a rear wall 150 at the rear of plug 140 that functions as an actuation surface 150. This actuation surface 150 also functions as the Relief closure. Plug 140 including its rear wall 150 move past the closed position so as to enclose seat 110 and open the relief port D as the seal 134 move away from the seat line 133.

Plug 140 is not affected by the upstream pressure P1 and is driven by the actuation surface/rear wall 150 pushed by the downstream pressure P2 and plug 140 stays in equilibrium with the preset spring 160 force.

The plug 140 closing position starts at the point at which the lip 145 of plug 140 engages the seat lip 115.

The opening of the relief port D starts as the piston seal 134 move away from the relief seat line 133.

As the downstream pressure P2 rises, piston's 150 force prevails over the force of the spring 160 and plug 140 moves to close, thereby reducing the downstream pressure P2.

If the downstream pressure P2 drops beyond the set point, the spring 160 prevails and the valve plug 140 opens thereby recovering the downstream pressure P2. Spring 160 and plug 140 are configured such that when pressure at the outlet port C drops below a set point, plug 140 is opened by spring 160 and the continuous flow path (of fluid such as water) is restored so as to recover pressure P2 at the outlet port C.

Operation of the Valve shown in FIG. 3A-3E

As the lip 145 of plug 140 of the valve moves past the main valve flow closing position, it opens the relief flow windows 135 to the collection channel 136 and to the drain port D to P3 (atmosphere).

The plug 140 is unaffected by upstream pressure P1 and is driven by the cross-section of rear flange 150 of plug 140 affected by the downstream pressure P2 and plug 140 stays in equilibrium with the preset spring 160 force.

The closing position of pressure reducing plug 140 starts as the plug lip 145 engages the seat lip 115. At the same instance the relief flow starts as the relief window tip 133 move away from the seal 134.

As the downstream pressure P2 rises, the force of plug 140 (which is equal to the cross section of piston 150 times P2) prevails over the force of the spring 160 and the plug 140 moves to close, thereby reducing the downstream pressure P2.

If the downstream pressure P2 drops beyond the set point, the force of spring 160 prevails over the force of plug 140 and plug 140 is reopened by the force of the spring 160, thereby recovering the downstream P2.

The following parts of valve body 100 are labeled in FIGS. 3A-3E
 A Inlet port
 B Throttled downstream pressure zone
 C Outlet port
 D Relief port
 P1 Upstream pressure
 P2 Downstream pressure
 P3 Relief pressure (Atmosphere)
 100 Valve Body
 105 Valve Body flange
 106 Outlet connection groove
 110 Inlet flow diffuser
 111 Ribs
 115 Seat lip
 118 Stop surface
 119 Plug seal
 120 Inlet body segment
 121 Seal
 125 Inlet connection grooved
 126 Inlet segment flange
 130 Relief segment
 133 Relief widow tip
 134 Relief seals
 135 Relief widows
 136 Relief collection Channel
 137 Relief collection casing
 140 Throttling plug
 145 Plug lip
 155 Stop ribs
 160 Spring
 170 Bolt—Washer—Nut In FIGS. 1A-FIGS. 3E, the length of sleeve 143, i.e. side wall 141 of plug 140, is such that in some embodiments plug 140 closes at or around the same time that the relief flow along relief flow path to relief port D opens. The further displacement of the plug 140 during the second portion of the motion begins to open the relief flow path just when plug 140 is closed against valve seat 110.

Figure 4:
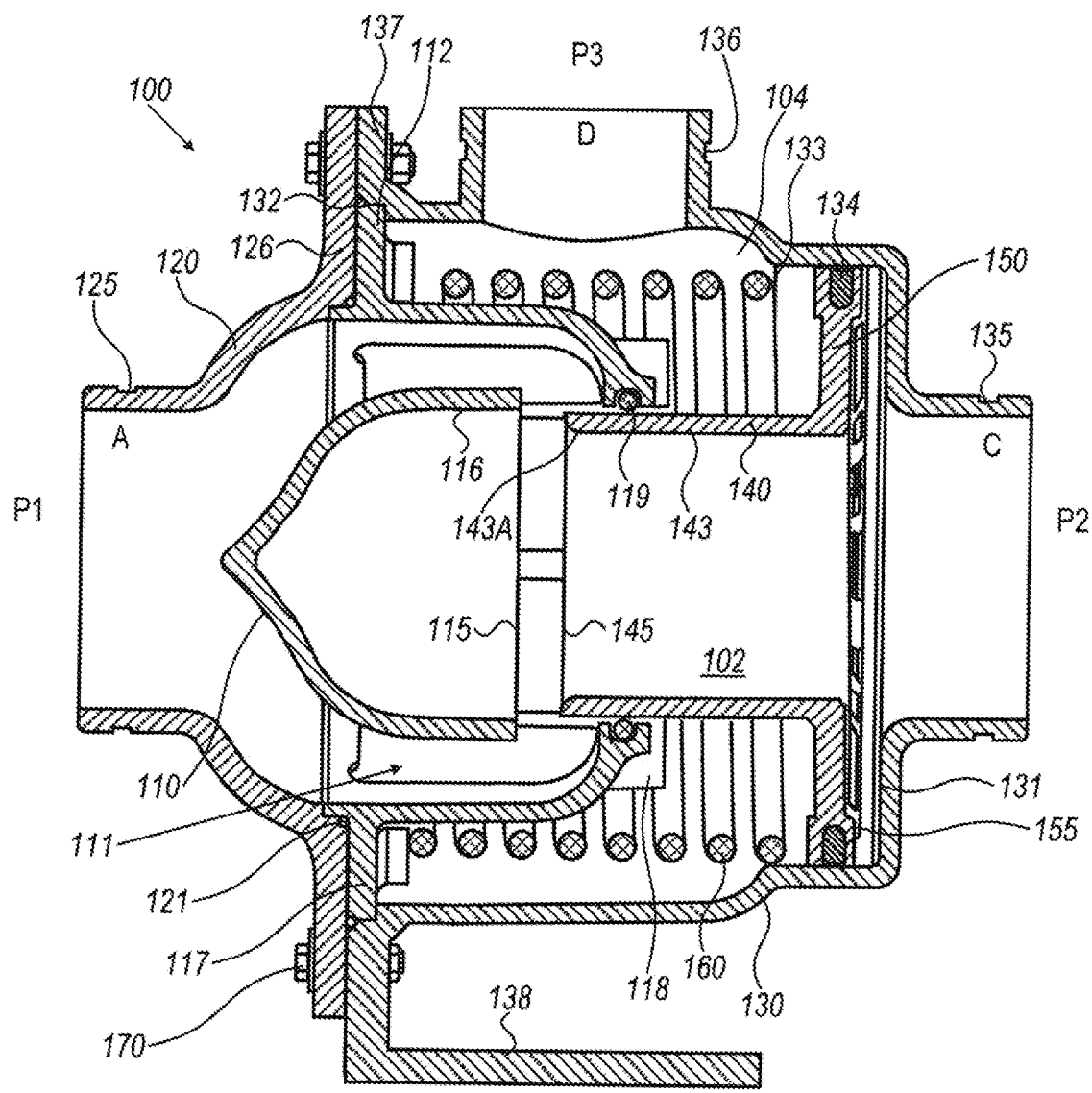
FIG. 4 is a sectional view similar to FIG. 1B except that the sleeve of the plug has been lengthened, in accordance with an embodiment of the invention.

In other versions of valve body 100, sleeve 143 of plug 140 may be lengthened or shortened (in proportion to the other parts of valve body 100) compared to FIGS. 1A-3E. For example, if sleeve 143 is lengthened relative to FIG. 1A to FIG. 3E, for example as shown in FIG. 4, the flow along relief flow path to relief port D opens only after the closing of plug 140. For example, in the context of the embodiment shown in FIGS. 1A-1D this is only after plug 140 enters the throat (i.e. inner wall) of valve seat 110 (in one non-limiting example after plug 140 enters valve seat 110 and has traveled 3% of its expected travel inside valve seat 110). Accordingly, in that case, plug 140 is long enough that the further displacement of plug 140 beyond the closed position during the second portion of the motion begins to open the relief flow path only after plug 140 is closed against valve seat 110. In some embodiments, a length of the sleeve 143 of plug 140 beyond a threshold length of sleeve 143 (wherein the threshold length of sleeve 143 is the length of sleeve 143 such that the relief flow path opening would occur simultaneously with the closing of plug 140 against valve seat 110) corresponds to a range of positions in which plug 140 has closed against valve seat 110 and the opening of the relief flow path has not yet occurred.

Figure 5:
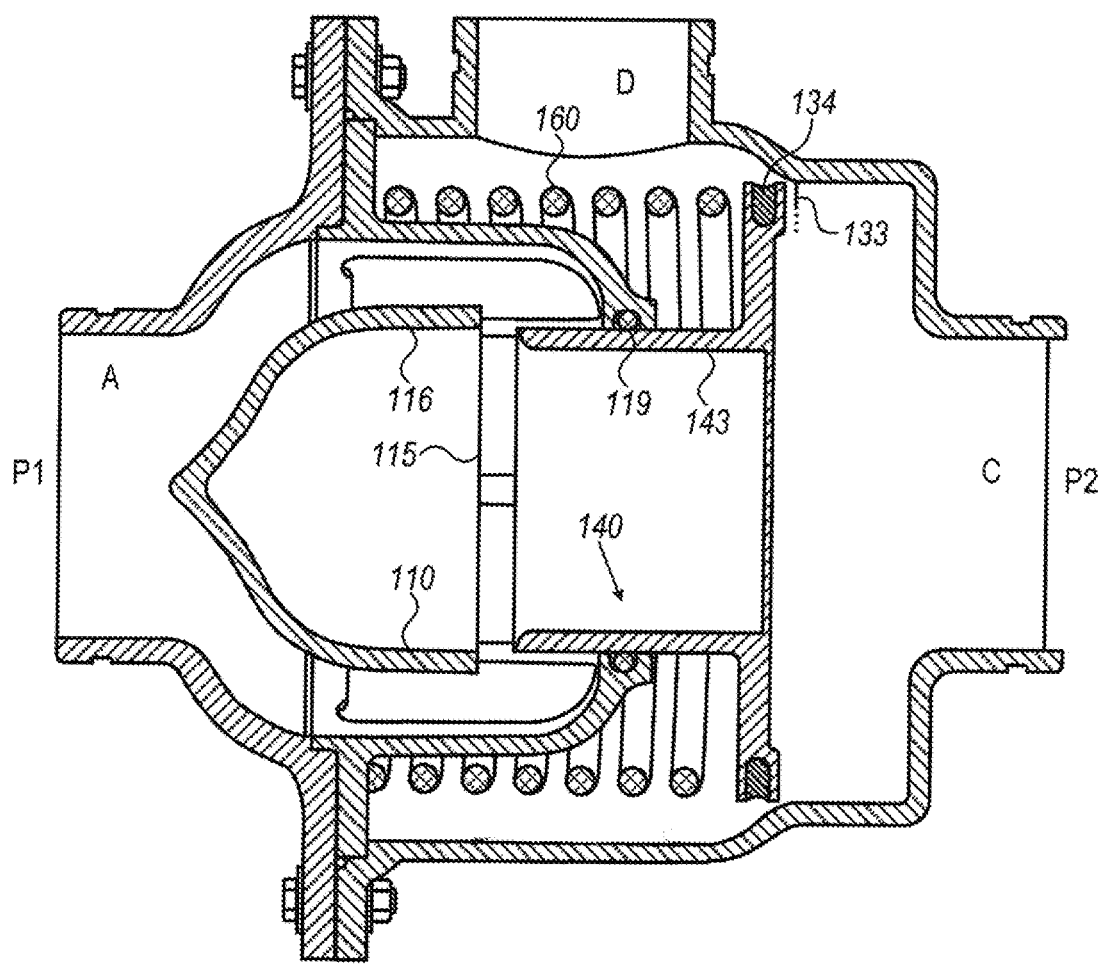
FIG. 5 is a schematic view similar to FIG. 1B except that the sleeve of the plug has been shortened, in accordance with an embodiment of the invention.

On the other hand, as shown in FIG. 5, if sleeve 143 of plug 140 is shortened relative to FIG. 1A to FIG. 3E, the flow along relief flow path to relief port D opens prior to the closing of plug 140 (as a non-limiting example, prior to the last 5% of the traveling of plug 140 before its closing). In that case, the first portion of the motion or displacement of plug 140 and the second portion of the motion of plug 140 overlap. Plug 140 is short enough that its further displacement during the second portion of the motion opens the relief flow path prior to the closing of plug 140 against valve seat 110.

In some embodiments, the magnitude that the length of the sleeve 143 is shorter than a threshold length of the sleeve 143 (wherein the threshold length of sleeve 143 is the length of sleeve 143 such that the relief flow path opening would occur simultaneously with the closing of plug 140 against valve seat 110) corresponds to a range of positions in which the relief flow path is open without plug 140 having closed against valve seat 110.

It will be appreciated that the above descriptions are intended only to serve as examples, and that many other embodiments are possible within the scope of the present invention as defined in the appended claims.

What is claimed is:

1. A pressure regulating and pressure releasing valve, comprising:
   (a) a valve body defining an inlet port, an outlet port, a valve seat and a pressure release opening;
   (b) a pressure regulating plug configured to be displaced during a first portion of a motion from an open position, which provides a continuous flow path from the inlet port to the outlet port, to a closed position in which the plug is closed against the valve seat to obstruct the continuous flow path;
   (c) a spring configured to bias the plug from the closed position to the open position,
   the plug having an actuation surface exposed to a pressure at the outlet port such that the pressure at the outlet port displaces the plug against the bias of the spring toward the closed position,
   wherein further displacement of the plug beyond the closed position during a second portion of the motion that is beyond a range of the first portion of the motion, opens a relief flow path from the outlet port through the pressure release opening to an area external to the valve body,
   wherein the valve body has a central part and a peripheral part and wherein the valve seat and the plug are structured such that the fluid flow path travels through the central part and the relief flow path is in the peripheral part of the valve body,
   wherein the central part of the valve body is inside the plug in the open position and in the closed position.

2. The valve of claim 1, wherein an outer wall of the plug is radially inward from an inner wall of the valve seat relative to a longitudinal axis running through the central part of the valve body from the inlet port to the outlet port.

3. The valve of claim 1, wherein the peripheral part of the valve body is radially outward from the plug relative to a longitudinal axis running through the central part of the valve body from the inlet port to the outlet port.

4. The valve of claim 1, wherein a forward and inward edge of a sleeve of the plug is situated relative to the valve seat such that an upstream pressure does not affect displacement of the plug.

5. The valve of claim 1, wherein the continuous flow path is provided from the inlet port passing between the valve seat and the plug and continuing to the outlet port.

6. The valve of claim 1, wherein the actuation surface comprises a flange at a rear of the plug.

7. The valve of claim 1, wherein the plug is displaced linearly relative to the valve seat during the motion.

8. The valve of claim 1, wherein the spring and plug are configured such that when pressure at the outlet port drops below a set point, the plug is opened by the spring and the continuous flow path is restored so as to recover pressure at the outlet port.

9. The valve of claim 1, wherein the further displacement of the plug beyond the closed position during the second portion of the motion begins to open the relief flow path just when the plug is closed against the valve seat.

10. The valve of claim 1, wherein the further displacement of the plug beyond the closed position opens the relief flow path from the outlet port through the pressure release opening to an area external to the valve body while flow from the inlet port remains obstructed.

11. The valve of claim 1, wherein the actuation surface is exposed to the pressure at the outlet port such that the pressure at the outlet port displaces the plug against the bias of the spring toward the closed position as a continuous function of the outlet pressure, thereby achieving outlet pressure regulation.

12. A pressure regulating and pressure releasing valve, comprising:
    (a) a valve body defining an inlet port, an outlet port, a valve seat and a pressure release opening;
    (b) a pressure regulating plug configured to be displaced during a first portion of a motion from an open position, which provides a continuous flow path from the inlet port to the outlet port, to a closed position in which the plug is closed against the valve seat to obstruct the continuous flow path;
    (c) a spring configured to bias the plug from the closed position to the open position,
    the plug having an actuation surface exposed to a pressure at the outlet port such that the pressure at the outlet port displaces the plug against the bias of the spring toward the closed position,
    wherein further displacement of the plug beyond the closed position during a second portion of the motion that is beyond a range of the first portion of the motion, opens a relief flow path from the outlet port through the pressure release opening to an area external to the valve body,
    wherein the valve body has a central part and a peripheral part and wherein the valve seat and the plug are structured such that the fluid flow path travels through the central part and the relief flow path is in the peripheral part of the valve body,
    wherein the peripheral part of the valve body is radially outward from the plug relative to a longitudinal axis running through the central part of the valve body from the inlet port to the outlet port.

13. The valve of claim 12, wherein an outer wall of the plug is radially inward from an inner wall of the valve seat relative to a longitudinal axis running through the central part of the valve body from the inlet port to the outlet port.

14. The valve of claim 12, wherein the continuous flow path is provided from the inlet port passing between the valve seat and the plug and continuing to the outlet port.

15. The valve of claim 12, wherein the actuation surface comprises a flange at a rear of the plug.

16. The valve of claim 12, wherein the plug is displaced linearly relative to the valve seat during the motion.

17. The valve of claim 12, wherein the spring and plug are configured such that when pressure at the outlet port drops below a set point, the plug is opened by the spring and the continuous flow path is restored so as to recover pressure at the outlet port.

18. The valve of claim 12, wherein the further displacement of the plug beyond the closed position during the second portion of the motion begins to open the relief flow path just when the plug is closed against the valve seat.

19. The valve of claim 12, wherein the further displacement of the plug beyond the closed position opens the relief flow path from the outlet port through the pressure release opening to an area external to the valve body while flow from the inlet port remains obstructed.

20. The valve of claim 12, wherein the actuation surface is exposed to the pressure at the outlet port such that the pressure at the outlet port displaces the plug against the bias of the spring toward the closed position as a continuous function of the outlet pressure, thereby achieving outlet pressure regulation.

21. A pressure regulating and pressure releasing valve, comprising:
(a) a valve body defining an inlet port, an outlet port, a valve seat and a pressure release opening;
(b) a pressure regulating plug configured to be displaced during a first portion of a motion from an open position, which provides a continuous flow path from the inlet port to the outlet port, to a closed position in which the plug is closed against the valve seat to obstruct the continuous flow path;
(c) a spring configured to bias the plug from the closed position to the open position,
the plug having an actuation surface exposed to a pressure at the outlet port such that the pressure at the outlet port displaces the plug against the bias of the spring toward the closed position,
wherein further displacement of the plug beyond the closed position during a second portion of the motion that is beyond a range of the first portion of the motion, opens a relief flow path from the outlet port through the pressure release opening to an area external to the valve body,
wherein the valve body has a central part and a peripheral part and wherein the valve seat and the plug are structured such that the fluid flow path travels through the central part and the relief flow path is in the peripheral part of the valve body,
wherein the further displacement of the plug beyond the closed position opens the relief flow path from the outlet port through the pressure release opening to an area external to the valve body while flow from the inlet port remains obstructed.

22. The valve of claim 21, wherein the actuation surface is exposed to the pressure at the outlet port such that the pressure at the outlet port displaces the plug against the bias of the spring toward the closed position as a continuous function of the outlet pressure, thereby achieving outlet pressure regulation.

23. The valve of claim 21, wherein the continuous flow path is provided from the inlet port passing between the valve seat and the plug and continuing to the outlet port.

24. The valve of claim 21, wherein the actuation surface comprises a flange at a rear of the plug.

25. The valve of claim 21, wherein the plug is displaced linearly relative to the valve seat during the motion.

26. The valve of claim 21, wherein the spring and plug are configured such that when pressure at the outlet port drops below a set point, the plug is opened by the spring and the continuous flow path is restored so as to recover pressure at the outlet port.

\* \* \* \* \*